(12) United States Patent
Shaked et al.

(10) Patent No.: US 9,047,349 B2
(45) Date of Patent: Jun. 2, 2015

(54) METHODS FOR EFFECTIVE PROCESSING OF TIME SERIES

(75) Inventors: Guy Shaked, Beer-Sheva (IL); Vladimir Braverman, Los Angeles, CA (US); Victor Belyaev, Beer-Sheva (IL); Gabby Rubin, Sunnyvale, CA (US); Marina Sadetsky, Kfar-Saba (IL)

(73) Assignee: Yanicklo Technology Limited Liability Company, Wilmington, DE (US)

( * ) Notice: Subject to any disclaimer, the term of this patent is extended or adjusted under 35 U.S.C. 154(b) by 168 days.

(21) Appl. No.: 12/753,388

(22) Filed: Apr. 2, 2010

(65) Prior Publication Data

US 2011/0060753 A1    Mar. 10, 2011

(30) Foreign Application Priority Data

Apr. 5, 2009 (IL) .......................................... 197961

(51) Int. Cl.
*G06F 7/00* (2006.01)
*G06F 17/30* (2006.01)

(52) U.S. Cl.
CPC .... *G06F 17/30551* (2013.01); *G06F 17/30598* (2013.01); *G06F 17/30595* (2013.01); *G06F 17/30864* (2013.01)

(58) Field of Classification Search
CPC .................. G06F 17/30595; G06F 17/30598; G06F 17/30864
USPC ........................................................ 707/752
See application file for complete search history.

(56) References Cited

U.S. PATENT DOCUMENTS

| | | | |
|---|---|---|---|
| 5,675,785 A | 10/1997 | Hall et al. | |
| 5,926,810 A * | 7/1999 | Noble et al. | ........................... 1/1 |
| 6,408,292 B1 * | 6/2002 | Bakalash et al. | ....................... 1/1 |
| 6,438,537 B1 | 8/2002 | Netz et al. | |
| 6,640,244 B1 * | 10/2003 | Bowman-Amuah | .......... 709/207 |
| 7,219,109 B1 * | 5/2007 | Lapuyade et al. | ............. 719/318 |
| 7,415,617 B2 * | 8/2008 | Ginter et al. | ................... 713/189 |
| 7,945,572 B2 * | 5/2011 | Lapin et al. | .................... 707/752 |
| 7,974,984 B2 * | 7/2011 | Reuther | ......................... 707/777 |
| 8,140,545 B2 * | 3/2012 | Iselborn et al. | ................ 707/752 |
| 2002/0087587 A1 | 7/2002 | Vos et al. | |
| 2002/0169777 A1 * | 11/2002 | Balajel et al. | .................... 707/10 |
| 2003/0105658 A1 | 6/2003 | Chen et al. | |
| 2004/0133552 A1 * | 7/2004 | Greenfield et al. | ................ 707/1 |
| 2004/0139116 A1 * | 7/2004 | Porter | ......................... 707/104.1 |

(Continued)

FOREIGN PATENT DOCUMENTS

| | | |
|---|---|---|
| JP | 62-290948 | 12/1987 |
| JP | 2007-272518 | 10/2007 |
| WO | WO 01/35256 A2 | 5/2001 |

OTHER PUBLICATIONS

International Search Report mailed Apr. 12, 2010; International Appln. No. PCT/IL09/01187, filed Dec. 14, 2009.
Japanese Office Action for Application No. 2011-540324 dated Nov. 5, 2013.
Canadian Office Action dated Oct. 24, 2013 in Application No. 2,746,724 (3 pages).

(Continued)

*Primary Examiner* — Mark E Hershley
(74) *Attorney, Agent, or Firm* — Knobbe, Martens, Olson & Bear LLP

(57) ABSTRACT

A method of effectively representing and processing data sets with time series is disclosed. The method may comprise representing time series as a virtual part of data in a data store layer of a user system, thereby allowing processing of time-series related queries in said data store layer of said user system.

15 Claims, 5 Drawing Sheets

(56) References Cited

U.S. PATENT DOCUMENTS

| | | | |
|---|---|---|---|
| 2005/0044102 A1* | 2/2005 | Gupta et al. | 707/102 |
| 2006/0173926 A1* | 8/2006 | Kornelson et al. | 707/200 |
| 2006/0190432 A1* | 8/2006 | Wang et al. | 707/3 |
| 2007/0005297 A1* | 1/2007 | Beresniewicz et al. | 702/181 |
| 2007/0191688 A1* | 8/2007 | Lynn | 600/300 |
| 2008/0126408 A1* | 5/2008 | Middleton | 707/104.1 |
| 2008/0133454 A1* | 6/2008 | Markl et al. | 707/2 |
| 2009/0006310 A1* | 1/2009 | Tanaka et al. | 707/1 |
| 2009/0018996 A1* | 1/2009 | Hunt et al. | 707/2 |
| 2010/0235365 A1* | 9/2010 | Newby, Jr. | 707/752 |

OTHER PUBLICATIONS

European Search Report dated Sep. 16, 2013, Application No. 09833059.0-1951 / 2377021 PCT/IL2009/001187, 11 pages.

Fabien De Marchi et al.; "Analysis of existing databases at the logical level", *ACM Sigmod Record*, vol. 32, No. 1, Mar. 1, 2003, pp. 47-52.

Surajit Chaudhuri et al.; "Self-Tuning Database Systems: A Decade of Progress"; *Proceedings of the 33$^{rd}$ International Conference on Very Large Data Bases*, Sep. 23, 2007-Sep. 28, 2007, pp. 3-14.

* cited by examiner

METHODS FOR EFFECTIVE PROCESSING OF TIME SERIES

BACKGROUND OF THE INVENTION

Description of the Related Art

Recently handling of massive quantities of continuously evolving data has become an inevitable necessity. The data evolution naturally results in a bold distinction between time and all other features of the data; this is mainly due to the following reasons: Firstly, from the data distribution perspective time possesses unique properties. These characteristics include the (natural) time-based order of new arrivals, timestamps that are changing rapidly and constantly, and well-defined spreading of data across the time domain. Secondly, data evolution undoubtedly puts time at the focus of the users' curiosity. For evolving processes, it is natural to study the characteristics that are closely related to the time domain and may entirely span it. To give just a few examples: a user may want to improve forecasting by mining historical data, gain precision by limiting analysis to recent portions of the data, track the shifts of trends, identify sudden changes, and capture unusual events. Finally, time-based projection is natural and well defined; the history of every moment of the process set is defined by the appropriate historical data subset.

The uniqueness of the time domain has brought new opportunities and simultaneously created new challenges for the field of data processing. Most existing systems approach these challenges by distinguishing the time domain from other domains and handling it differently. For example, temporal databases are specifically designed to deal with various aspects of the time attribute. The difference between temporal and other databases is significant; it touches on all components of data base design and implementation including different data storing and providing unique language (e.g. TSQL) for the data access. The reason for these explicit efforts is that the inability to address time domain effectively may (and eventually will) result in serious damage for the end user. This damage spans virtually all aspects of data processing including, for example, system performance, data representation, transparency of the process, robustness to bursty data. To summarize, time is a component of today's data; handling temporal data may require effective, cautious and unique approaches.

Time Series (TS) is a special case of temporal data where the importance of time domain is brought to the edge. Virtually all evolving processes can be presented as a time series; that property makes study of time series a fundamental problem. Generally speaking, a common case of time series is a sequence of data elements given in an increasing order of the time attribute. For instance, a trading history of a single stock can be seen as an ordered sequence of pairs (timestamp, value). Here value is the quote of the stock at the time that is represented by a timestamp. Naturally, the appearance order of the elements is defined solely by the time domain; that is an element with the earlier timestamp appears before the element with the later one. In a slightly more complex example, a history of a portfolio can be seen as a sequence of triples (timestamp, stock, value). The time series represents all stock of the portfolio and again, the appearance of a triple is defined by its timestamp.

The aforementioned challenges of time series processing are threefold.

The performance-related challenges express the system's needs to cope with the lack of resources as the system's data scales. In certain cases, performance characteristics can be critical and can be decisive when it comes to the choice of a solution. In the time series environment performance of any solution must be nearly real-time since TS analysis may require immediate response since even moderate delays may outdate the majority of the results.

The data modeling challenges are at least as important as performance objectives. These challenges express the necessity of a clear well-defined view of the evolving process. Successful data modeling for time series is a non-trivial task. It goes beyond enhancing existing solutions with more powerful software or hardware and almost inevitably implies involvement of expensive human resources. In regard to this a well-known drawback of many database systems is the extensive additional investments that are required in maintenance personnel and solutions, where typically the associated expenses are higher then the initial cost. Usually a long and costly process is required to understand the underlying dynamics of time series and propose an effective data representation. Unfortunately, in many cases, data evolution diminishes the value of results obtained by this process after a relatively short period of time. Among other measures of data modeling efficiency, simplicity of data representation may, in certain cases, be the critical one as it has immediate impact on the amount of resources that must be invested. Therefore, simplicity can, in certain cases, be a critical measure of any time series solution. Most existing solutions are very complex.

For any functionality, the level of its implementation can, in certain cases, be critical. Time series are implemented at the application layer in the vast majority of today's products that use time series. As was mentioned before, the generality of today's products prevents such an implantation in a data store layer and defers it to the application layer. Since the application layer is at least one layer above the data store layer, this placement cripples the ability of user system to deliver good performance. Implementing time series in the data store layer may have decisive impact on the overall performance of user system. Such a kind of implementation will cause time series to be recognized by data store as a part of basic data entry.

There are implementations known in the art that, in their attempts to avoid the complexity of a time series treatment, have populated a whole time dimension, i.e. created a full snapshot of the status at each time in the time dimension, so the time series query will be simplified. The draw back for this solution is that it can be expensive both in the time it takes to create the snapshots and the amount of storage it requires. A simple example of how a system using the full snapshot approach handles a query made on Aug. 27, 2008 requesting the status of an individual's bank account between the 5th and 26th of August, 2008 is schematically illustrated in FIG. 1. The basic data is that on Aug. 5, 2008 there was $30 in the account and $20 was deposited on Aug. 26, 2008 raising the total to $50 in the account. Referring to FIG. 1, queries 16 originating on the client machines 12 are relayed either directly or via a network 14 indirectly to the application layer 18 of transaction system 10. Application layer 18 comprises the application 22 that executes the time series implementation that produces the full time dimension snapshot 24 from data located in the data store layer 20.

FIG. 2 illustrates the drawbacks of the full time dimension snapshot approach taken by system 10. On August 27, the data store layer 20 contains only two entries 26. However, in order to create the full snapshot 24 depicting the state of the account on August 26, the time series implementation 22 creates a snapshot for each date in the range of interest for this account, i.e. twenty six data entries 24 are created and retained, regardless if there was a change in a data or not. From this very simple example it is clear that the full time dimension snapshot approach to processing time series is expensive both in terms of the time it takes to create the snapshots and also in the amount of storage it requires.

Time series simplify the development of applications with complex business rules in a wide variety of sectors. Queries for historical data, replete with time ranges and roll ups and arbitrary time zone conversions are difficult in a data store. Compositions of those rules are even more difficult. This is a problem compounded by the free nature of applications themselves. In the prior art can be found applications which may be especially designed for time series needs only, e.g. 'Historis' database and 'Commodity Server'.

Many methods for time series processing exist; however conventionally, most of them address only a single dimension of the TS problem. That is, there exist solutions that address the performance-related issues of time series for a specific and predefined type of queries. Alternatively, there exist solutions that try to represent time series in a simple and convenient way. The inventors are not aware of any solution that combines solutions of these problems to provide a general solution that addresses all aforementioned types of challenges of time series.

DEFINITIONS

Throughout this specification, the following exemplary definitions are employed:

Data Entry: A collection of single data items, herein Data Entry Coordinates, i.e. Data Entry (Dimensional) Coordinates are the components of a data entry. In other words, a collection of data entry coordinates defines the unique key of data entry, which is to be used in data manipulations—search, arrangement etc. In Table 1, presented herein below a Data Entry is represented as one of the numbered rows, and a Data Entry Coordinate is represented by one cell of a Data Entry.

Dimension: A metadata component that contains (dimension) members which categorize each data entry (e.g. product, city, and color). For example in the below referenced Table 1, the Dimensions are represented by the columns "product" and "date".

Measure: A quantified parameter of a data entry. For example in the above referenced Table 1, the Measure is represented by the column "quantity".

Query: A constrained request to retrieve information from an application. The user sends queries to the application and gets in return data. Usually the data in return is processed data, based on data from the data store.

Locality of data: Density of data entries, related to a specific data entry coordinate, on data entries storage place, e.g. disc or memory.

Time series: A sequence of values usually recorded at regular intervals (yearly, monthly, weekly, etc.); a sequence of data elements given in some order of the time attribute.

Application: Herein the word "application" means application in the application layer of a user system that uses time series.

Organize: Unless specifically mentioned, the word "organize" is used herein to mean "to sort", "to index", etc.

Object: The word "object" is used herein to mean a part of a data entry recognizable by data store layer and usable for manipulations, e.g. data organization, query processing, on data in a data store layer.

DETAILED DESCRIPTION OF PREFERRED EMBODIMENTS

Certain embodiments address the problem of effective presentation and processing of time series. Methods of evaluating queries on time series are presented. The effectiveness of certain embodiments is based on the representation method of the time series. The representation method of certain embodiments addresses both performance-related and data representation challenges. Thus, certain embodiments are configured to address both types of problems effectively, and also to address both problems substantially simultaneously. As a result, a very simple solution may be optionally obtained. One optional advantage of certain embodiments of the foregoing method is that it reduces or minimizes the amount of additional effort that is needed to handle the time domain. Optionally, the aforementioned advantage may be achieved with no or with minor impact on performance of time series. In particular, the same or nearly the same performance may be obtained as if the time series were manually configured, (e.g., continuously generating and updating some or all specific tables and views that represent a time series measure). This property is briefly illustrated herein below by presenting examples of how certain types of queries can benefit by being handled by the method of certain embodiments.

Figure 1:
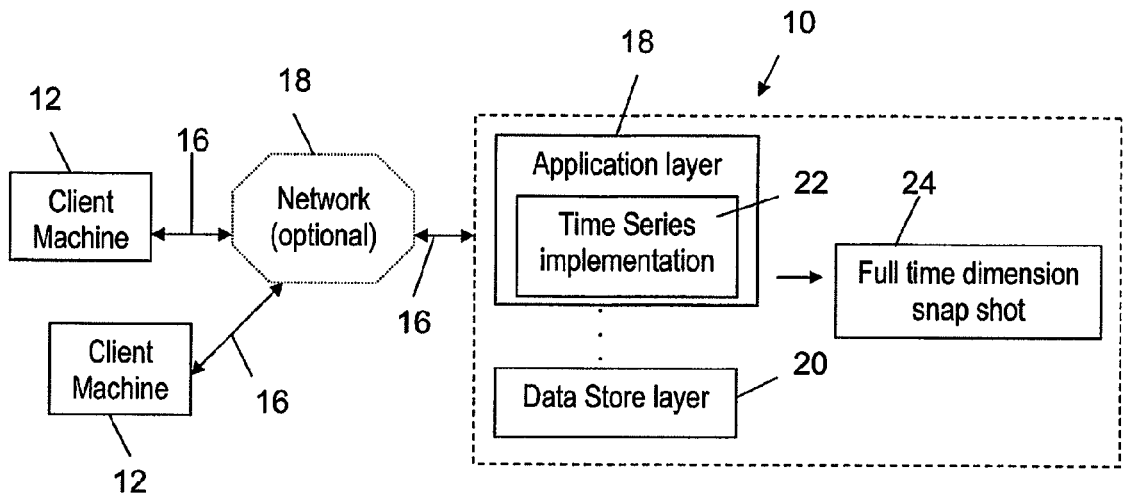
FIG. 1 schematically shows how a typical prior art system uses the full time dimension snapshot approach to handle a query.
Figure 2:
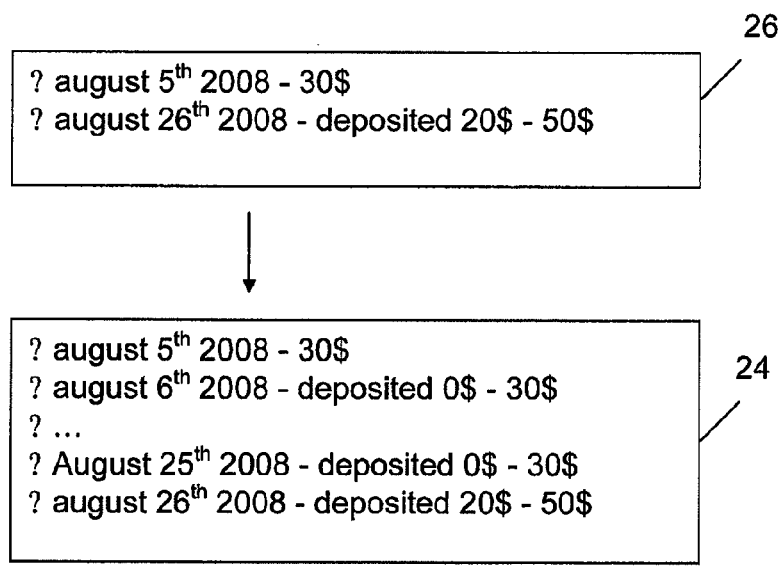
FIG. 2 schematically illustrates the drawbacks of the full time dimension snapshot approach taken by the system of FIG. 1.
Figure 3:
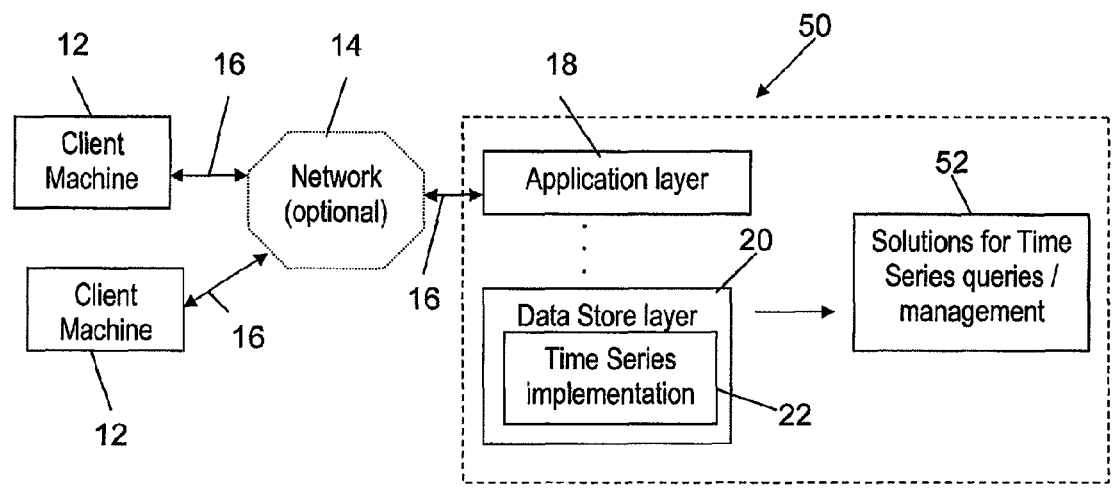
FIG. 3, by way of example, schematically shows the concept of the system of one embodiment of the invention.

FIG. 3 schematically shows the concept of the system 50 of certain embodiments of the invention. Queries 16 originating on the client machines 12 are relayed either directly or via a network 14 indirectly to the application layer 18 of system 50. In system 50 the module 22 that executes the time series implementation is located in the data store layer 20. This results in simple solutions 52 for Time Series queries/management. As compared to the prior art system shown in FIG. 1, the system of certain embodiments can allow minimization or a reduction of the amount of additional effort needed to handle time domain, without damaging critical Time Series functionality or performance, and provide the ability to address query performance and data representation challenges simultaneously.

Certain techniques are provided for treating time series. One technique represents a time series as a part of a data entry in a data store layer of the user system. This representation of time series is referred to herein as Basic Object of Time Series (BOTS) representation. Another technique is referred to herein as Reverse Order (RO). RO is a method of organizing the data in the data store layer in a manner that, in contrast to conventional prior art relational database management systems, does not require storing the data in timestamp order.

As was mentioned previously, the generality of today's applications prevents implementations of supplementary functions in a data store layer. As a result, time series are implemented at the application layer in conventional applications. Since the application layer is at least one layer above the data store layer, this placement can cripple the ability of the data store to deliver good performance in functionality with time series involved. Implementing time series in the data store layer may have decisive impact on the overall performance of the user system.

Figure 4:
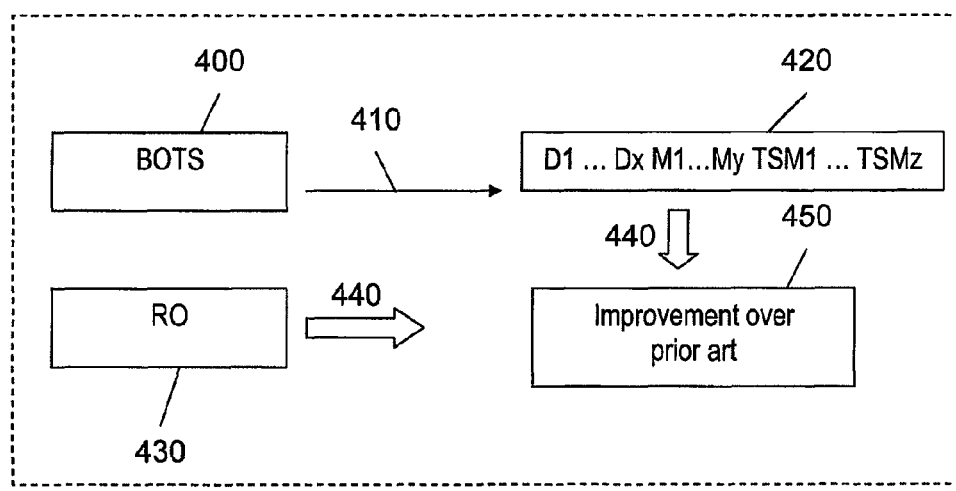
FIG. 4, by way of example, schematically describes the implementation of one embodiment in the data store layer of a user system.

FIG. 4, by way of example, schematically describes the implementation of one embodiment in the data store layer of a user system. According to the BOTS representation of the invention, data store layer objects for time series 400 are implemented 410 as an additional measure in the data store entry. According to BOTS the data entry structure 420 for a data entry having dimensions $D_1 \ldots D_x$, measures $M_1 \ldots M_y$, and time series $TSM_1 \ldots TSM_z$ is:

$D_1 \ldots D_x M_1 \ldots M_y TSM_1 \ldots TSM_z$

Either used alone or in combination with the RO of time series 430, the BOTS representation 420 provides 440 at least two advantages 450 over prior art systems that will be illustrated herein below. BOTS can have a decisive impact on the overall performance of the user system and enables optimizations otherwise impossible to identify in prior art systems.

The BOTS representation, in certain embodiments, lowers the level of time series to the data store layer so that time series becomes a basic part of a data entry for which it is defined in a data store layer. As a result, a data store layer recognizes time series and can treat it independently of the application layer of the user system.

BOTS representation enables the complexity of time series implementation to be hidden from the upper application layer. As a result, applications can optionally be greatly simplified. Examples of some of the optional benefits of BOTS representation are: queries simplification saves application development time, decreases probability of critical errors and thus shrinks the period of development cycle; plain data organization, e.g., the arrangement of the data, eases user system maintenance, replication and restoring.

Certain embodiments of BOTS provide the lower layer visibility to a data store layer that that has not been conventionally achieved. As a result, certain embodiments of BOTS enable optimizations that otherwise may be difficult or impossible to identify. In particular, higher level time series implementations in conventional user systems hide any indication of time series data from the data store layer. Thus, even a simple decision problem of identifying time series is difficult or impossible in a data store layer. More complex and critical tasks, e.g., tracking data shifts and maintaining high locality, cannot be executed in a data store layer. In contrast, certain embodiments of BOTS make these tasks possible, effectively executable, and/or easily implemented in a data store layer.

Figure 5:
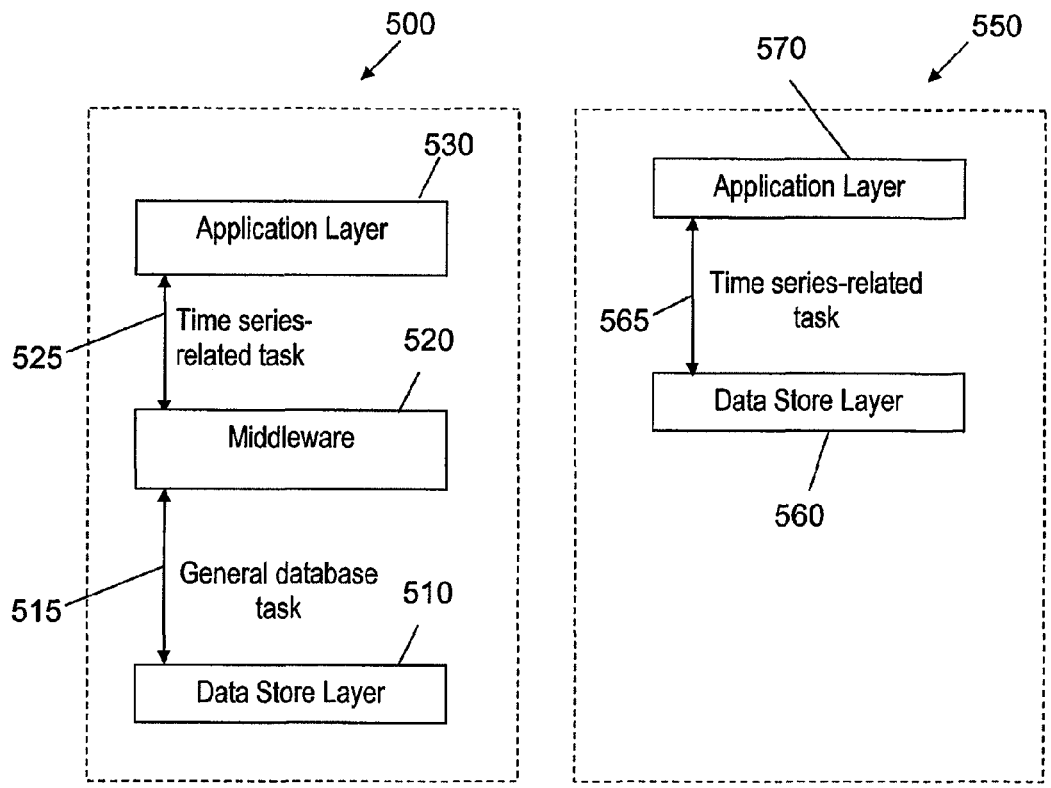
FIG. 5, by way of example, schematically illustrates the strength of Basic Object of Time Series (BOTS)

FIG. 5, by way of example, schematically illustrates the strength of certain embodiments of BOTS. In the left side of FIG. 5 is shown a conventional user system 500 using a general Data Base Management System (DBMS) without time series support. User system 500 comprises application layer 530 and data store layer 510. Consider an application that processes time series frequently and thus must adjust its needs to DBMS general language. One possibility is to build middleware software layer 520 that translates time series-related tasks to general database tasks. Schematically, this can be seen as a double-linked chain:

Application (Time Series Awareness)↔Middleware ↔DBMS (General Data)

where double headed arrow 525 in FIG. 5 represents time series related tasks and double headed arrow 515 represents general database tasks. As is demonstrated, the complexity of a system modified in this manner doubles in the best case. In the worst case, the complexity of the middleware may be very high and may make negligible any optimizations of the DBMS or application sides.

BOTS enables changes schema 500 and eliminates, minimizes, or reduces the impact of the middleware. As shown in the right side of FIG. 5, in the user system 550 the data store layer 560 is enhanced with the BOTS representation. This allows time series related tasks 565 to be carried out directly in the data store layer. Schematically this is can be seen as follows:

Application (Time Series Aware)↔DBMS (enhanced with BOTS time series)

This schema enables optimizations on the DBMS part to have an immediate positive impact on the overall performance of the user system.

An example of how query processing in a conventional user system compares to that in a user system with BOTS is now presented.

Example 1

Assume the following user query: 'Show stock of Cola for each month of period starting from January 2008 and up to December 2008'.

Table 1 shows data entries in the data store layer and the user system uses YTD (Year To Date) time series.

TABLE 1

| Product dimension | Date dimension | Quantity measure |
| --- | --- | --- |
| Cola | January 2008 | 10 |
| Cola | March 2008 | 5 |
| Cola | April 2008 | 16 |
| Cola | November 2008 | 7 |

A possible scheme of query processing in a conventional user system may be as follows. For each requested date in a given query, the application layer of the user system would compose a separate query and send this query to the data store layer of user system. This query contains logic for YTD calculation according to a specific date hard coded in the query. Then the results of all the queries would be combined into a single query result and sent to the user.

The composed queries in SQL may be defined as follows:

```
Select product, 'Jan2008', measure
From table
Where product = 'Cola' and date in ('Jan2008');
Select product, 'Feb2008', measure
From table
Where product = 'Cola' and date in ('Jan2008', 'Feb2008');
Select product, 'Dec2008', measure
From table
Where product = 'Cola' and date in ('Jan2008',..., 'Dec2008');
```

The result for each of the queries above is a row in the result for a given query. The result for the query is as follows:

```
'Cola    Jan2008 10'
'Cola    Feb2008 10'
'Cola    Mar2008 15'
'Cola    Apr2008 31'
'Cola    May2008 31'
'Cola    Jun2008 31'
'Cola    Jul2008 31'
'Cola    Aug2008 31'
'Cola    Sep2008 31'
'Cola    Oct2008 31'
'Cola    Nov2008 38'
'Cola    Dec2008 38'
```

Figure 6:
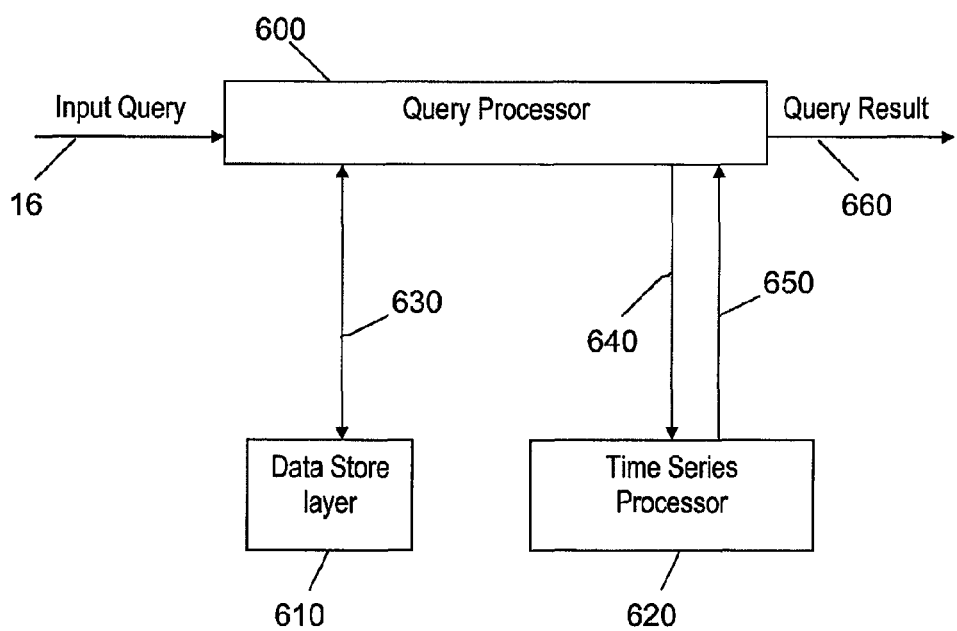
FIG. 6, by way of example, schematically shows an embodiment of the query processing workflow in a user system with BOTS.

FIG. 6 schematically shows an embodiment of the query processing workflow in a user system with BOTS. BOTS is a virtual measure of a data store entry (e.g., a measure not existing in data entries of a data store layer). Time series may be calculated by external or internal procedure in data store layer. Each time series will be defined as an additional measure. The input query is represented by arrow 16. First a Query Processor 600 collects 630 some or all the relevant data entries from a data store layer 610 according to some or all the query's conditions (optionally partially) ignoring time dimensions, which are used for the queried time series measures calculations. Then Query Processor 600 sends one or more requests 640 to Time Series Processor 620 in order to calculate one or more time series measures of the query. Time Series Processor 620 sends 650 the calculated time series measures to Query Processor 600 which determines and sends the query result 660 to the user.

The following example illustrates BOTS definition and its usage in the query processing of the same query as that of Example 1.

Example 2

The user system uses YTD time series. BOTS for YTD time series measure may be defined in a data store layer as follows:

```
:
<measure_YTD>
    <Logic of measure calculation: summarize all data entries' measures
starting from the year of a given date, and up to the given date>
</measure_YTD>
```

Since the data store layer 'knows' the meaning of YTD, there is no need to rewrite the original query in order to explain which data entries exactly should be taken for YTD measure calculation of each date. So in the case of a user system configured according to the invention the query in SQL may be defined as follows:

```
Select product, date, measure_YTD
From table
Where product = 'Cola' and date in ('Jan2008', ..., 'Dec2008');
```

Query Processor collects the following data entries from data store for this query:

```
'Cola    Jan2008    10'
'Cola    Mar2008    5'
'Cola    Apr2008    16'
'Cola    Nov2008    7'
```

The calculation of measure_YTD would be executed with all the data entries above as an input. For each requested prefix 'product date' Query Processor combines all the data entries above into a single intermediate data entry as follows:

```
'Cola Jan2008 measure_YTD (Jan2008 10; Mar2008 5; Apr2008 16;
Nov2008 7)'
...
'Cola Dec2008 measure_YTD (Jan2008 10; Mar2008 5; Apr2008 16;
Nov2008 7)'
```

Query Processor sends a request for each intermediate data entry above to Time Series Processor in order to calculate time series measure measure_YTD. Time Series Processor sends calculated time series measure values to Query Processor which adds them to the result data entries of the query. Query Processor returns a query result to the user. The result for the query is as follows:

```
'Cola    Jan2008 10'
'Cola    Feb2008 10'
'Cola    Mar2008 15'
'Cola    Apr2008 31'
'Cola    May2008 31'
'Cola    Jun2008 31'
'Cola    Jul2008 31'
'Cola    Aug2008 31'
'Cola    Sep2008 31'
'Cola    Oct2008 31'
'Cola    Nov2008 38'
'Cola    Dec2008 38'
```

Summarizing examples 1 and 2, the application layer of the conventional user system must translate a given query into middle queries so that the data store layer of the user system can understand these queries and return appropriate result data. The user system in accordance with an example embodiment sends a given query as it is received from the user directly to the data store layer, which uses logic in BOTS in order to return appropriate result data. The conventional user system scans the data store layer and extracts relevant data entries twelve times for each middle level query. The user system in accordance with an example embodiment scans the data store layer only once (for a given query), and then manipulates the extracted data entries to create a result for a given query. The application layer of the conventional user system will combine results of all middle queries into a single query result and send it to the user. A user system in accordance with an example embodiment gets a result for a given query directly from the data store layer, optionally with no need to apply additional work on it. This example demonstrates only several of the possible simplifications of a user system in accordance with an example embodiment.

The current invention also makes an approach of multi dimensional Time Series representation (Time Series of Time Series) easily available in a user system. An example instance of multi dimensional Time Series is Time Series history representation and management. Certain conventional systems may have the ability to do this, but it is as hard to carry out as in the example of YTD i.e. must be implemented at the application layer of the conventional system. The concept behind this challenge is presented in the following example in which the data store entries, with four dimensions and one measure that are shown in Table 2, are given.

TABLE 2

| dimensions | Security ID | Price Type | Period | Update Period | $ |
| --- | --- | --- | --- | --- | --- |
| Entry #1 | IBM | Open | 1.1.2008 | 1.1.2008 | 500 |
| Entry #2 | IBM | Open | 1.2.2008 | 1.2.2008 | 505 |
| Entry #3 | IBM | Open | 1.3.2008 | 1.3.2008 | 400 |
| Entry #4 | IBM | Open | 1.1.2008 | 1.4.2008 | 410 |

The meaning of the last entry, entry #4, is as follows: on Jan. 4, 2008 a user updates the data to show that the price of IBM stock in period Jan. 1, 2008 is $410 and not $500 as it was updated on update period Jan. 1, 2008. The user wants this update to be valid only from update period Jan. 4, 2008. This means that when a user queries the application for the price of IBM stock on Jan. 1, 2008 that is valid for an update period which comes earlier to the update period Jan. 4, 2008, for example update period Jan. 3, 2008 (Time Series history, or Time Series of Time Series), the result of this query should be $500. Table 3 contains query results for the following user queries: 'Present Time Series of IBM stock price for Period of January 2008, for each Update Period of January."

TABLE 3

| | Period | | |
| --- | --- | --- | --- |
| Update Period | 1.1.2008 | 1.2.2008 | 1.3.2008 |
| 1.1.2008 | 500 $ | | |
| 1.2.2008 | 500 $ | 505 $ | |
| 1.3.2008 | 500 $ | 505 $ | 400 $ |
| 1.4.2008 | 410 $ | 505 $ | 400 $ |

An additional (optional) feature is the way the data is arranged, i.e. the method of data organizing, in the data store layer. The arrangement is called herein "reverse-order (RO)" in order to emphasize the dissimilarity with the time series in conventional relational database management systems. For example in section 2.4 of the online users guide (release 8.04) of the Oracle8 Time Series Cartridge [http://download.oracle.com/docs/cd/A58617_01/cartridg.804/a5750/ts_tscon.htm] the indexing system is described as follows: "The data must be stored in timestamp order, because many of the analytical functions require access to the data in this order". RO is a concept that may bring significant performance improvements by not requiring that the data be stored in timestamp order and thereby enables more efficient methods of storing data to be used to produce responses to time series related queries. The concept of RO will be illustrated by the following examples.

Example 3

Figure 7:
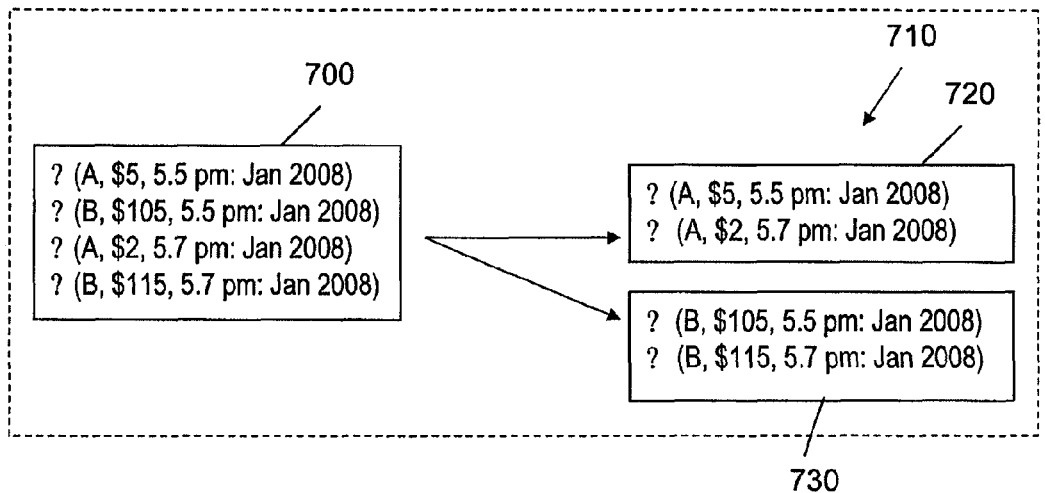
FIG. 7, by way of example, schematically shows a time series data entries of a stock market that trades two stocks A and B with and without Reverse Order (RO)

FIG. 7 schematically shows time series data entries of a stock market that trades two stocks A and B in both the conventional and RO. The input data stream consists of pairs (stock id, price) ordered by the time of their appearances. The time series data in the conventional art 700 is an interleaved arrangement of data for both stocks as follows:
(A, $5, 5.5 pm: January 2008), (B, $105, 5.5 pm: January 2008) (A, $2, 5.7 pm: January 2008), (B, $115, 5.7 pm: January 2008) . . . .

The same time series in the Reverse Order 710 will consist of distinct streams for each stock id, e.g. stream 720 for stock A and 730 for stock B. Thus, each stream will represent the history of a specific stock in time. In the RO 710 the original time series 700 is represented as follows:
(A, $5, 5.5 pm: January 2008), (A, $2, 5.7 pm: January 2008) . . .
and
(B, $105, 5.5 pm: January 2008), (B, $115, 5.7 pm: January 2008) . . . .

Example 4

Consider a time series that represents a stream of shipped orders from an on-line store. Such a stream is a sequence of tuples p1, p2, . . . such that each tuple comprises all attributes of a specific order, such as price, discount, type of product, shipping location etc. The stream is arranged in timestamp-increasing order because each "event" is inserted into the data stream immediately after it is processed.

RO is an arrangement where the history of the elements is grouped together. For example, assume that the product "Driver-side mirror for Infinity QX56" was ordered 3 times, one time in each of the months January March and November. In the conventional art time series these orders appear far apart from each other due to the fact that their timestamps are different. In the RO they appear successively.

Certain embodiments utilize BOTS to enable RO to be effectively maintained in systems where this type of organization type can not normally be done. RO necessitates changing data representation in the data store layer and may be useless when time series are implemented in higher layers. BOTS together with RO creates a powerful combination for time. However it may be effective to implement BOTS without RO but not vise versa. BOTS is a more general concept that can be implemented without RO but the system performance can be improved when BOTS is enhanced by RO.

Since many real-life applications deal with time series data, it is natural to assume that the vast majority of queries have strong dependence on the time domain. Thus, since many queries have time dimension inside the system conventional art systems pre-calculate store data according to time dimension to improve queries performance. But this might be the wrong approach. For instance, the trading history of a single stock can be seen as an ordered sequence of pairs (timestamp, value). This is a good example of RO logic usage, since in order to get the history of a single stock the data should be ordered by stock id dimension first and only then by time dimension. RO brings considerable performance improvements for this type of query.

Now detailed explanations of RO are presented for several important types of queries. The actual improvement in user system performance may vary, depending on parameters such as type of query, size of the domain, size of the data and physical properties of used hardware.

A range query is a query that limits a domain of interest to a specific subset. Usually (but not necessarily) the query subset represents a successive range of elements, explaining the term "range". Note that any subset can be represented as a union of disjoint ranges. A query whose range contains only a singleton is referred to as a "point query".

Examples of range queries are:

"Output all products that have been shipped from Irvine, Calif.".

This query limits the locations domain to a singleton of "Irvine".

"What is the maximal increase of price for all diary products that were sold in Pasadena during last month?"

This query limits locations to Pasadena, types of product to "diary" and the time domain to the last month.

"Output all automotive products whose sales have increased by more then 10% within last month."

This query limits increase sales to more then 10%, types of product to "automotive", and the time domain to the last month.

Range queries are of particular importance in database applications in general and in time series applications in particular. This is because they allow drawing histograms of data distribution which in turn are considered a good approximation of the actual data distribution. Also, in practice, many queries have the locality property, i.e. a user is typically not interested in analyzing the entire data set but rather limits the analysis to a smaller subset of relevant data.

Figure 8:
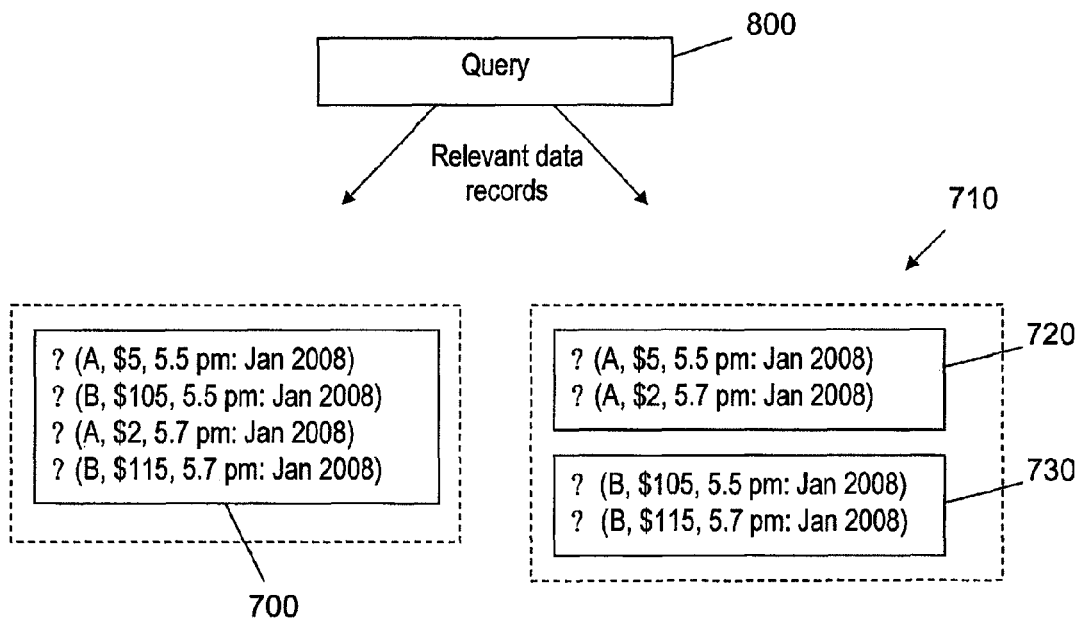
FIG. 8, by way of example, schematically shows how RO allows answering queries with high locality relative to the size of the domain more effectively then it can be done with the prior art representation of time series.

FIG. 8 schematically shows how RO allows answering queries with high locality relative to the size of the domain more effectively than can be done with the conventional art organization type of time series. The main reason for such improvement is because the data is split into disjoint chunks which can be processed separately. For example if the query 800 is "select price, time from table where stock id is A", the conventional art system must search through all data 700. When using the RO together with BOTS, the system goes directly to stream 720 to obtain the data necessary to respond to the query. In conventional art systems, large amounts of data lose locality and need a lot more time to process. Therefore, for user systems with large domain size RO will be especially effective.

A data mining query is a general notion of a query that is intended to identify interesting and unexpected correlations in the underlying data set.

Typically such a task implies intensive data scanning and applying complex algorithms. Mining queries are of great importance for today's applications, therefore many systems provide unique treatments for them and even special language, e.g., DMQL.

Examples of data mining queries are:

"Count the number of discounted products for which the discount has resulted in the overall increase of revenue"

"Find association rules in the set of products that were purchased within the last two months"

"Given two portfolios, find significant correlations between pairs of stock time series".

"Find hotels which have discounted rooms and are close to the University and China Town".

"Find any outliers in the portfolio, i.e. stocks that differ significantly from the average trends; find any sudden changes that occurred within the last hour".

RO has significant optional advantages over other methods for processing data mining queries over time series. The optional advantages come from the fact that RO clusters data related to an element together, thus minimizing the amount of resources required for processing. For instance finding correlations between two stocks can be done by processing data that is only relevant to these stocks. For large scale data sets this can result in order-of-magnitude performance savings.

Historical data analysis may be of great importance for data warehouses, OLAP applications, and temporal databases. The applications include financial analysis and forecasting, web log analysis, network routing and simulations, and market basket analysis. Since it is often useful to represent historical data time series fast processing of complex queries is a fundamental problem. Examples of some types of historical data analysis queries are:

Cumulative Aggregations

Queries such as Year-To-Date, Quarter-To-Date, Month-To-Date, Year-Over-Year, Quarter-On-Quarter and many others represent the useful information that is to be gathered about a particular evolving process. Typically such a query is applied on a time series of dimensions such as the price of a stock or the value of a company; however, the applicability is not limited to the investment market, and this type of query can be applied on any time series where gathering cumulative information is important.

RO is especially well suited for cumulative analysis. The major advantage comes from the fact that the history of a particular element is represented as a continuous chunk of data. The proximity of the relevant data entries to each means that the amount of resources required to process the data can be minimized and depends only on the amount of data that is actually relevant.

Moving Window Aggregations

In many cases applications are not interested in processing the entire data set, but instead tend to limit the analysis to the recent portion of the data. For instance, a typical assumption in forecasting is that future values of many time series greatly depends only on the most recent history and that the dependency drops exponentially with the age of past observations. For such time series, the relevant portion of data is defined by a moving window of most recent arrivals. Many functions can be computed on sliding windows including Moving Averages, Moving Sums, Moving Counts, etc.

Moving Windows present an additional challenge, namely dealing with deletions. When an element has expired, its impact on the final answer should be removed. A standard approach implies re-computing the function for every shift of moving window. But even for moderate sizes of moving windows this implies significant computational overhead. RO minimizes this overhead and thus is advantageous for moving windows. RO minimizes the amount of data to re-compute for each data segment and thus greatly improve the overall performance of moving window computations.

In addition to the mentioned optional advantages that can be achieved by RO, BOTS representation provides a boost in performance for the examples of historical data analysis given above that is independent of RO. A reason for the improvement in performance is the awareness of time series structure. As a result of the use of BOTS, standard optimizations of data storage can be applied and adjusted for time series data. When using the time series as a basic object in the database a very simple single query is required in order to get this functionality. This enables optimization otherwise not available for this type of query. This is an example where the simplicity improves performance. Specifically, since historical queries have higher data locality then general queries, historical mining enjoys better performance using BOTS. The actual improvement depends on the ratio between the data store size and the size of the relevant data. Potentially the improvement is of several orders of magnitude.

Another advantage of RO, which is not limited to time series and is applicable in a more general settings as well, is its suitability for parallel and distributive computing. In particular, given multiple queries to be executed on the single time series, it is possible to construct a query plan in such a way that the same data portion will be scanned only once and all queries will be run in parallel. This may be a valuable property, given the distributed nature of many applications. Locality of data in these queries causes a significant improvement in load data scan times that is not achievable by pure indexing, which although it may reduces scan time still does not cause locality which is only achieved by the data organization.

The data modeling challenges are at least as important as performance objectives. Responding to these challenges involves having a clear and well-defined view of the evolving process. Successful data modeling for time series is a non-trivial task that goes beyond enhancing existing solutions with more powerful software or hardware and almost inevitably implies involvement of expensive human resources. Unfortunately, in many cases data evolution diminishes the value of this process after a relatively short period of time.

Among other measures, simplicity of data representation is a critical one as it has immediate impact on the amount of resources to be invested. Therefore, simplicity is a critical measurement of any time series solution. Most existing solutions for dealing with time series are very complex in contrast to the very simple method provided by the current invention.

BOTS representation may greatly diminish the impact of time series model on the complexity of the system. Since time series defines the time domain as the most important domain, processing time series requires system adjustments. These adjustments typically are made by treating time series differently from other data in many aspects. BOTS lowers these adjustments to the data store layer, where they can be implemented efficiently and optionally independently of the higher layers. Further, RO reduces the differences in treatment of time series to a single aspect which is the order of data. These techniques may hide the complexity of usage and management of a system with time series from the user/application developer. As a result, the amount of effort that is required to maintain time series is reduced or minimized.

Typical queries for time series are not easy to express in standard declarative languages, such as SQL. These standard languages were designed for general data stores and are not well-suited for time series. Since the uniqueness of the time domain was not specifically designed into the language, the proper treatment of time series using standard languages requires complex code. The corresponding price includes human resources for code maintenance, increased probability of errors, and higher risk of incompatibility and performance issues. Since BOTS representation reduces or minimizes the number of aspects in which the time domain should be treated differently from other domains, the related code can be simplified. The syntactical simplicity brings, in turn, reductions in cost, effort and improvement in overall performance.

BOTS representation and RO minimize the number of rules that are unique for the time domain. As a result, the amount of resources, both human and hardware can be decreased, especially over long term periods. This is because in the conventional art each special rule requires special treatment either by a person or by a program. Minimization of human involvement is of particular importance since BOTS representation and RO are robust to structural and fact changes. Adding new elements and deleting or updating the existing ones does not change the structure and can be done with minimal effort since the data to be deleted is kept together.

BOTS representation improves the overall system visibility. As a result, it is easier for end users to gather knowledge about the system and visualize the evolution process, and easier for the application manager to manage since he has a lot fewer items to manage. BOTS representation defines a process that is transparent and easy-to-repeat.

Figure 9:
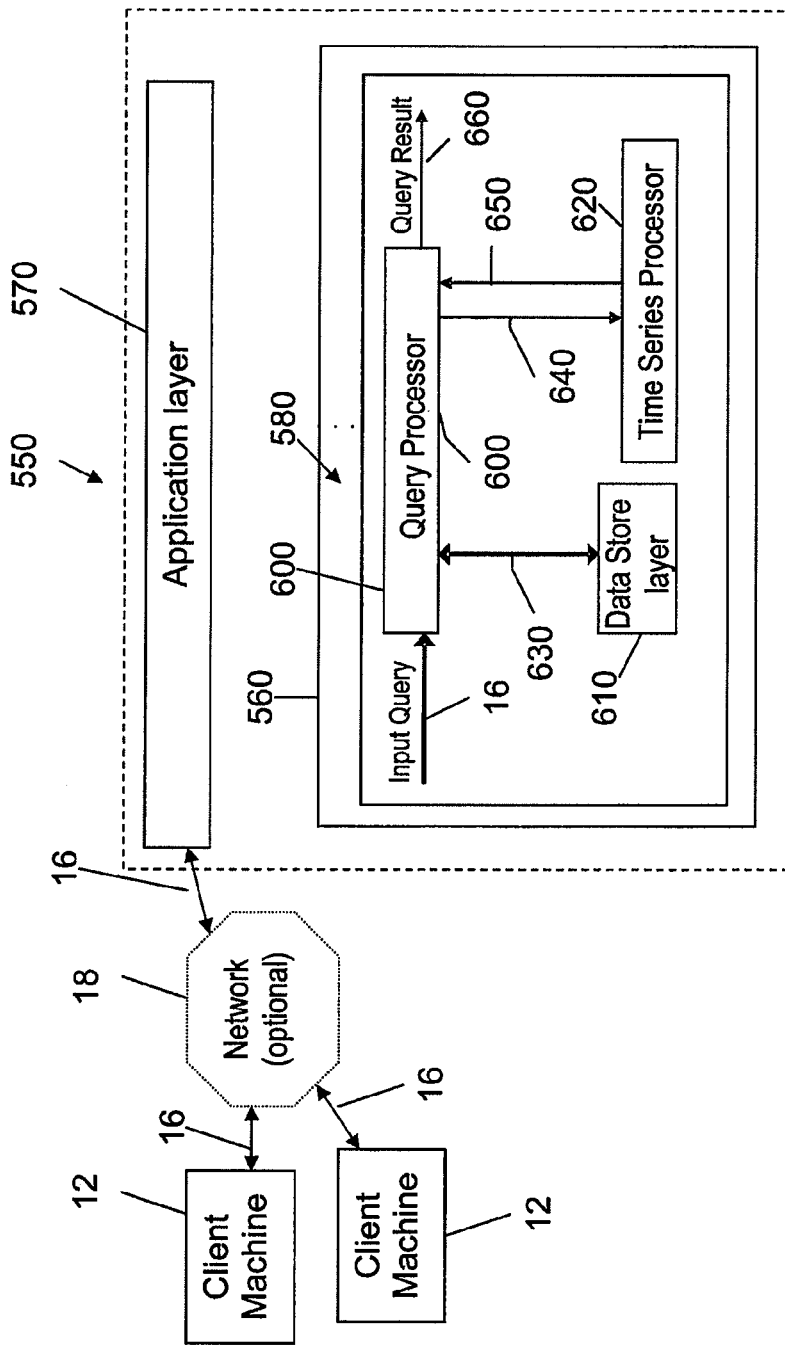
FIG. 9, by way of example, schematically shows a user system with Time Series module.

FIG. 9 schematically shows a user system 550 comprising an example Time Series module 580. As in the conventional system, queries 16 originating on the client machines 12 are relayed either directly or via a network 18 directly to the application layer 570 of system 550. In system 550 the module that executes the time series implementation is located in the data store layer 560 and is called Time Series module 580. [Note that FIG. 3 describes a user system with Time Series module and FIG. 6 describes components and workflow of the Time Series module.]

Embodiments described herein may be implemented via software, hardware, or a combination of hardware and software. For example, certain embodiments may include programmatic instructions stored on non-transitory, tangible memory (e.g., RAM, ROM, EEPROM, semiconductor memory, optical memory, magnetic memory, etc.), and a computing system or other device that includes a process that executed the instructions to perform functions described herein. User interface devices, such as displays, mice, speakers, and/or printers may also be provided. The computing system (e.g., a personal computer or other terminal) may include a network interface to communicate with one or more other computing devices.

Although embodiments of the invention have been described by way of illustration, it will be understood that the invention may be carried out with many variations, modifications, and adaptations, without exceeding the scope of the claims.

What is claimed is:

1. A method comprising:
    maintaining a data store that is configured to provide an answer to one or more queries comprising a requested dimension and a requested measure;
    representing at least a portion of time series data as a virtual part of data in the data store without actually being stored in the data store, the time series data comprising a sequence of data elements given in some order of a time attribute, thereby enabling processing of time-series related queries in a data store layer of said user system;
    organizing data having a plurality of dimensions, including a time dimension and a non-time dimension, in the data store according to at least a first of said one or more dimensions, said first dimension being other than the time dimension, wherein the data is not stored in timestamp order, to form a first plurality of data streams for respective objects in the data, followed by organizing data in respective data streams for respective objects according to the time dimension, to thereby split the data into disjoint chunks, with respect to the time dimension, which can be processed separately in response to a time series query;
    receiving, at a computer system comprising one or more computing devices, at least a first time series query from a user directed to the data store; and
    at least partly in response to receiving the first time series query and without translating the first time series query into middle queries, scanning the data store layer, and manipulating extracted data entries to generate, by the computer system, a response to the first time series query at the data store layer based at least in part on data from the time series data that is a virtual part of data in the data store that is not actually stored in the data store.

2. The method of claim 1, where said computer system further comprises a relational database.

3. The method of claim 1, wherein the time series data relates to stocks.

4. A computing system comprising:
a processor; and
a computer readable medium storing machine-executable instructions including one or more modules configured for execution by the processor in order to cause the computing system to:
maintain a data store that is configured to provide an answer to one or more queries comprising a requested dimension and a requested measure;
represent at least a portion of time series data as a virtual part of data in the data store without actually being stored in the data store, the time series data comprising a sequence of data elements given in some order of a time attribute, thereby enabling processing of time-series related queries in a data store layer of said user system;
organize data having a plurality of dimensions, including a time dimension and a non-time dimension, in the data store according to at least a first of said one or more dimensions, said first dimension being other than the time dimension, wherein the data is not stored in timestamp order, to form a first plurality of data streams for respective objects in the data, followed by
organize data in respective data streams for respective objects according to the time dimension, to thereby split the data into disjoint chunks, with respect to the time dimension, which can be processed separately in response to a time series query;
receive at least a first time series query from a user directed to the data store; and
at least partly in response to receipt of the first time series query, and without translating the first time series query into middle queries, scan the data store layer, and manipulate extracted data entries to:
generate a response to the first time series query at the data store layer based at least in part on data from the time series data that is a virtual part of data in the data store that is not actually stored in the data store.

5. The computing system of claim 4, where said computing system further comprises a relational database.

6. The computing system of claim 4, wherein said computing system is a complementary system, which is added onto an existing user system using an existing interface.

7. The computing system of claim 4, wherein said computing system is an integrated system, which is integrated into an existing user system.

8. The computing system of claim 7, wherein said computing system is a complementary system, which is added onto an existing user system using an existing interface.

9. The computing system of claim 4, wherein said computing system is an integrated system, which is integrated into an existing user system.

10. The computing system of claim 4, where computing user system comprises a relational database.

11. The computing system of claim 4, wherein the time series data relates to stocks.

12. The computing system of claim 4, wherein the time series data relates to shipped orders from an on-line store.

13. The computing system of claim 4, wherein the time series data becomes part of a data entry for the data store.

14. A non-transitory computer-readable medium encoded with instructions thereon, wherein the instructions are readable by a computing system in order to cause the computing system to perform operations comprising:
maintaining a data store that is configured to provide an answer to one or more queries comprising a requested dimension and a requested measure;
representing at least a portion of time series data as a virtual part of data in the data store without actually being stored in the data store, the time series data comprising a sequence of data elements given in some order of a time attribute, thereby enabling processing of time-series related queries in a data store layer of said user system;
organizing data having a plurality of dimensions, including a time dimension and a non-time dimension, in the data store according to at least a first of said one or more dimensions, said first dimension being other than the time dimension, wherein the data is not stored in timestamp order, to form a first plurality of data streams for respective objects in the data, followed by organizing data in respective data streams for respective objects according to the time dimension, to thereby split the data into disjoint chunks, with respect to the time dimension, which can be processed separately in response to a time series query;
receiving at least a first time series query from a user directed to the data store; and
at least partly in response to receiving the first time series query, and without translating the first time series query into middle queries, scanning the data store layer, and manipulating extracted data entries to generate a response to the first time series query at the data store layer based at least in part on data from the time series data that is a virtual part of data in the data store that is not actually stored in the data store.

15. The non-transitory computer-readable medium of claim 14, wherein the time series data relates to stocks.

* * * * *